SUPERCONDUCTIVE TRANSMISSION LINE

Filed March 21, 1960 3 Sheets-Sheet 1

INVENTORS
JAMES C. SWIHART
DONALD R. YOUNG

BY [signature]
ATTORNEY

SUPERCONDUCTIVE TRANSMISSION LINE

Filed March 21, 1960 3 Sheets-Sheet 3

United States Patent Office 3,191,055
Patented June 22, 1965

3,191,055
SUPERCONDUCTIVE TRANSMISSION LINE

James C. Swihart, Hopewell Junction, and Donald R. Young, Poughkeepsie, N.Y., assignors to International Business Machines Corporation, New York, N.Y., a corporation of New York Filed Mar. 21, 1960, Ser. No. 16,431
11 Claims. (Cl. 307—88.5)

This invention relates to superconductive circuits and more particularly to improved superconductive transmission line circuits useful as delay lines.

The term delay line is broadly applied to those circuits and devices which are effective to increase the propagation time of electromagnetic energy over the free space value of approximately $3\times10^8$ meters per second. By way of example, delay lines have been employed in radio repeater stations, moving target indication radar equipment, and for the storage of digital information in data processing machines. Generally, in the storage of digital information, pulses of electro-magnetic energy, which are representative of digital information, are applied to the input of a delay line and are effectively in storage for the time required for the information to traverse the delay line and appear at the output thereof.

In general, delay lines are classified in two basic groups; those through which the electromagnetic energy itself is propagated, and those which include means for first converting the electromagnetic energy into another form of energy which is then propagated along the line and finally reconverted into the original electromagnetic energy. Examples of the latter group include the well-known mercury and quartz delay lines, and examples of the first group include lumped-constant and distributed-constant delay lines. However, each of these groups of delay lines is characterized by several disadvantages. By way of example, mercury and quartz delay lines exhibit an extremely large amount of attenuation, in order of 60 to 80 db, and are restricted to relatively narrow bandwidths. Lumped and distributed constant delay lines, which have been designed to exhibit only a reasonable amount of attenuation over an effective broad band of frequencies, are severely limited in the total amount of delay that can be obtained through a line having reasonable dimensions, and further, an increased amount of delay is obtainable only by reducing the band of frequencies which will propagate along the line.

What has been discovered is an improved transmission line, which is classified as a distributed constant transmission line delay line, wherein novel principles of superconductivity are employed to overcome all of the above enumerated disadvantages of the various delay lines of the prior art. The phenomenon of superconductivity, which is exhibited by certain materials at a sufficiently low temperature, includes the apparent absence of resistance to the flow of an electrical current and the ability of partially excluding all magnetic flux lines which attempt to penetrate the surface of the superconductive material. Superconductive delay lines have been known in the art as shown by U.S. Patent 2,916,615, wherein a superconductive transmission line is employed as a delay line having less attenuation than a conventional transmission line employing resistive conductors. Further, it has been known that the velocity of propagation along a distributed constant transmission line is inversely proportional to the square root of the dielectric constant of the medium separating the conductors of the transmission line and, for this reason, the delay obtainable per unit length of a transmission line is necessarily limited.

The delay per unit length afforded by the transmission line of the invention, however, it is not limited by the dielectric constant of the medium rather, through novel geometry and choice of superconductive operating temperature, the delay per unit length is increased by a factor of ten or more over the value expected from normal transmission line theory. Briefly, the novel delay line of the invention employs to advantage one of the characteristics of superconductive materials listed above, namely, that a magnetic field applied to a superconductive material penetrates the material only slightly. The term penetration depth is usually used to indicate the depth of penetration of the magnetic field. What has been discovered, as will be more particularly described in detail hereinafter, is that a superconductive transmission line whose dimensions, normal to the direction of propagation of the electromagnetic energy, are determined by and comparable to the penetration depth of the magnetic fields into the conductive elements of the transmission line exhibits a significant increase in inductance per unit length over the inductance which normally would be calculated from the geometry of the line. By way of example, an embodiment of the invention, to be hereinafter described in detail, with one of the conductive elements and the dielectric medium, having a dielectric constant four times that of free space, each having a thickness substantially equal to the penetration depth, is effective to propagate electromagnetic energy at one-tenth the normal free space value. Transmission lines of the prior art, however, employing a dielectric medium, having a dielectric constant of four, propagate electromagnetic energy at one-half the free space value.

A further embodiment of the transmission line of the invention features a tuneable resonant line wherein the effective resonant frequency of the line is altered by merely a change in the operating temperature and/or an externally applied magnetic field.

It is an object of the invention, therefore, to provide a novel superconductive transmission line useful as a delay line.

Another object of the invention is to provide improved input and output circuits for a delay line.

A further object of the invention is to provide a novel tuneable transmission line.

Still another object of the invention is to provide an improved pulse generator.

Yet another object of the invention is to provide a thin film superconductive transmission line having increased inductance per unit length.

Still a further object of the invention is to provide a superconductive transmission line wherein the velocity of propagation of electromagnetic energy therealong is determined by the operating superconductive temperature.

Another object of the invention is to provide a superconductive transmission line wherein the thickness dimension of the conductive elements and dielectric medium are substantially equal to the penetration depth of magnetic fields applied thereto.

The foregoing and other objects, features and advantages of the invention will be apparent from the following more particular description of preferred embodiments of the invention, as illustrated in the accompanying drawings.

Figure 1:
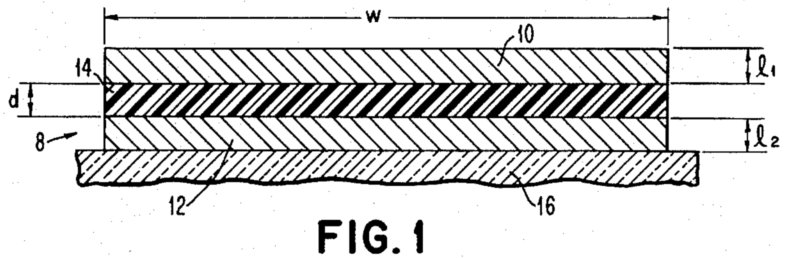
FIG. 1 is a sectional view of a portion of an embodiment of the transmission line of the invention.

Referring now to the drawings, FIG. 1 illustrates a first embodiment of the transmission line of the invention. As there shown, the transmission line, 8, includes two parallel conductors, identified as 10 and 12, separated by a dielectric medium 14. Each conductor 10 and 12 and the dielectric medium 14 have a common width $w$ which is much greater than the individual thicknesses $l_1$, $l_2$ and $d$, respectively, yet appreciably less than a wavelength of the highest applied frequency, although in FIG. 1, $l_1$, $l_2$ and $d$ are enlarged to show details. Electromagnetic energy propagates along transmission line 8 in a direction normal to the plane of the paper and from transmission line theory the velocity of propagation, $v_0$ is as follows:

$$v_0=c/\sqrt{\epsilon} \quad (1)$$

where:

$c$=the velocity of light in a vacuum;
$\epsilon$=the dielectric constant of the medium 14 relative to air, and the permeability $\mu$ is one.

Thus, by way of example, according to the prior art, if the dielectric medium 14 is air, the velocity of propagation of the electromagnetic energy along transmission 8 is equal to the velocity of light, or approximately $3\times10^8$ meters per second, and if the dielectric constant of medium 14 is four, the velocity of propagation is reduced to a value of about 0.5 times the velocity of light. However, applicants have discovered, as will shortly be described in detail, that by fabricating conductors 10 and 12 of superconductive material, operating at a predetermined superconductive temperature, and properly choosing dimensions $l_1$, $l_2$ and $d$, the velocity of propagation along line 8 is reduced by a factor of 10 or more. Further, since at least one of the dimensions $l_1$, $l_2$ and $d$ is of a magnitude comparable to the penetration depth of the magnetic fields into either of the superconductive conductors 10 or 12, each of the elements of transmission line 8 is advantageously formed by vacuum deposition techniques and, for this reason, line 8 is shown in FIG. 1 supported on a substrate 16.

As outlined above, conductors 10 and 12 are formed of superconductive material. Superconductive materials include such metals as tin, mercury, indium, lead, tantalum, indium, etc., as well as a number of compounds. For reasons to be discussed below, conductors 10 and 12 are preferably fabricated of an alloy of the class disclosed in copending application Serial No. 814,493, now Patent No. 2,981,511 filed May 20, 1959, on behalf of Morton D. Reeber, and assigned to the assignee of this invention. It should be pointed out that no complete theory of superconductivity exists at this time. However, a basic theory advanced by F. and H. London, which is discussed in detail in chapter VI of the work entitled, "Superconductivity" by D. Shoenberg, and published in 1952 by the Syndics of the Cambridge University Press, is sufficient to explain most, but not all, of the experimental data relating to the phenomenon of superconductivity.

Applicants have employed the Londons' equations relating to superconductivity, and by applying the boundary conditions imposed by the transmission line geometry, have derived the following equation for the velocity of propagation, $v$, of electromagnetic energy along a superconducting transmission line:

$$v=v_0/(1+\lambda_1/d \coth l_1/\lambda_1+\lambda_2/d \coth l_2/\lambda_2)^{1/2} \quad (2)$$

where:

$v_0$ is as defined above;
$l_1$, $l_2$, $d$ are as shown in FIG. 1;
$\lambda_1$ is the penetration depth in conductor 10; and
$\lambda_2$ is the penetration depth in conductor 12.

Several novel results are immediately apparent from Equation 2. First, in a conventional transmission line, $l_1$, $l_2$ and $d$ are very much greater than either $\lambda_1$ or $\lambda_2$ (which may be of the order of 1000 Angstrom units) and for this case Equation 2 reduces to that predicted by transmission line theory; namely, $v$ is equal to $v_0$. Second, in a transmission line employing the same superconductive material for conductors 10 and 12, which is the general case, $\lambda_1$ is equal to $\lambda_2$, and $l_1$ and $l_2$ are large compared to $\lambda_1$. By reducing the thickness $d$ of the dielectric medium to $\lambda_1$, one reduces the velocity $v$ to about $.577v_0$. Third, since coth $l/\lambda$ is greater than or equal to one, and increases as the ratio $l/\lambda$ decreases, velocity $v$ is still further reduced as either or both $l_1$ and $l_2$ decrease or $\lambda$ increases.

It has been known that the penetration depth for superconductive materials increase as the temperature of the material increases, and the relationship of penetration depth and temperature is as follows:

$$\lambda=\lambda_0/[1-(T/T_c)^4]^{1/2} \quad (3)$$

where:

$\lambda$=the penetration depth at a particular temperature;
$\lambda_0$=the penetration depth at 0° Kelvin;
$T$=the particular temperature; and
$T_c$=the critical temperature of the material, that is the temperature at which the material switches between the superconducting and resistive state.

Figure 3:
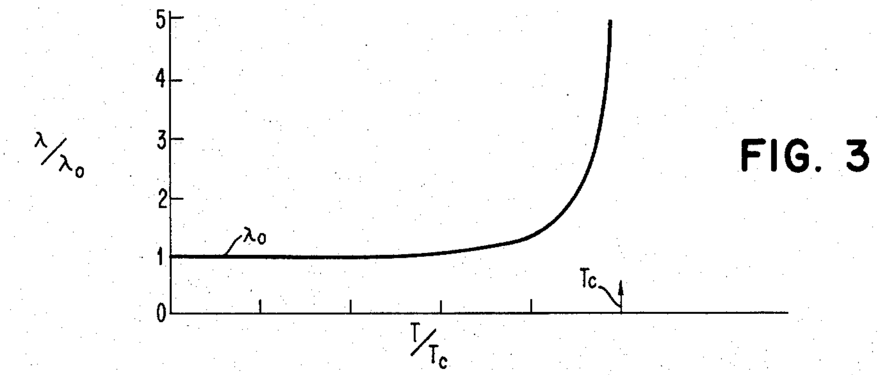
FIG. 3 is a curve illustrating the variation of penetration depths for a function of the operating superconductive temperature.

FIG. 3 is a plot which indicates the manner in which the penetration depth varies as a function of temperature, with the penetration depth rising sharply as the critical temperature is approached. Referring again to Equation 2, it is seen that velocity $v$, for a given geometry decreases sharply as the temperature of the transmission line approaches $T_c$, and correspondingly the delay per unit length of the transmission line increases. From FIG. 3, it appears desirable to operate a transmission line of the inventtion as near as possible to $T_c$ in order to obtain the maximum possible delay. However, there is a practical limit of closest approach of the operating temperature to $T_c$ in which there remains a reasonable current carrying capacity of the line without the conductors of the line switching from the superconducting to the resistive state. Further, thermal fluctuations make it impossible to hold a temperature an infinitisimal distance below $T_c$ without exceeding $T_c$ and switching the conductive elements into the resistive state. For these reasons, it is preferred to limit the operating temperature to equal or less than 0.99 $T_c$. Again, referring to FIG. 3, it is seen that if the operating temperature is much less than $T_c$, the delay characteristic of the line, although not a maximum, is relatively insensitive to temperature.

A second means of increasing the penetration depth, $\lambda$, is to employ an alloy superconductor for conductors 10 and 12. It is known that alloy superconductors, generally, exhibit a greater value of penetration depth $\lambda$. Further, the alloys of the hereinbefore referenced copending application exhibit a critical temperature relatively insensitive to composition, and thus are adaptable for use in a transmission line having a controlled and reproducible critical temperature.

Referring once again to Equation 2, it is seen that the velocity, $v$, is independent of the applied frequency. It should be pointed out that this is essentially exactly true for frequencies below about 1000 mcs. Above this frequency, the transmission line exhibits a finite A.C. resistance, creating energy losses in the superconductive elements 10 and 12, which increases with increasing frequency, resulting in the velocity also increasing with increasing frequency over the velocity $v$, calculated from Equation 2.

By way of example and for purposes of illustration only, the following specific values of a typical transmission line are outlined, it being understood a wide variety of parameters are possible. Table I gives the velocity, $v$, as a function of operating temperature T, for a transmission line having conductors 10 and 12 fabricated of tin ($\lambda^0$ equal to 500 Angstrom units) separated by a dielectric medium 14 having a dielectric constant of four. Further, $l1$ is equal to $d$ which is equal to 500 Angstrom units and $l2$ is effectively equal to infinity, that is, at least five times greater than $\lambda 2$.

*Table I*

| $T/T_c$ | $v$. |
|---|---|
| 0.90 | $6.15\times10^7$ meters per second. |
| 0.95 | $4.98\times10^7$ meters per second. |
| 0.98 | $3.57\times10^7$ meters per second. |
| 0.99 | $2.69\times10^7$ meters per second. |

Figure 2A:
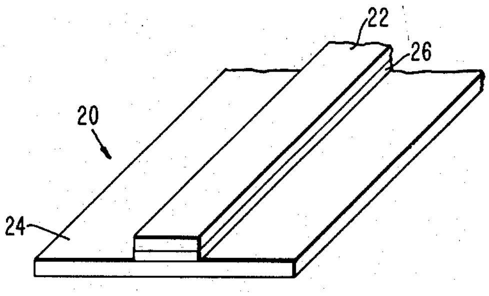
FIG. 2A is a pictorial view of another embodiment of the transmission line of the invention.
Figure 2B:
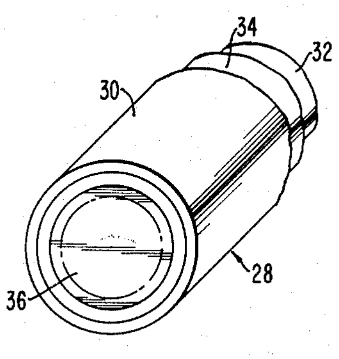
FIG. 2B is a pictorial view, partly in section, of yet another embodiment of the transmission line of the invention.
Figure 2C:
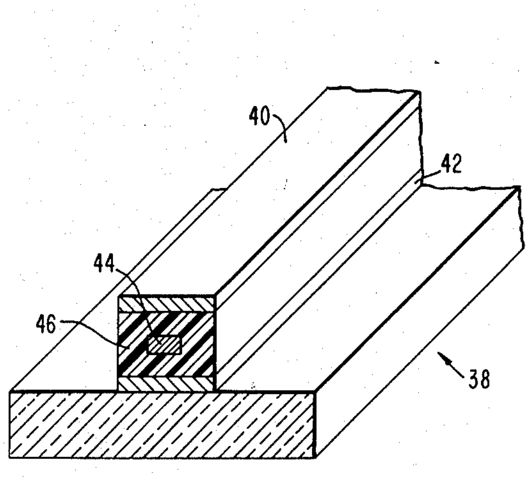
FIG. 2C is a pictorial view, partly in section, of still another embodiment of the transmission line of the invention.

Referring again to the drawings, FIGS. 2A, 2B and 2C illustrate further embodiments of the transmission line of the invention. FIG. 2A shows a microstrip transmission line 20 comprising a superconductive conductor 22 above a superconductive ground plane 24 separated by a dielectric medium 26, the thickness of each being determined, as required, by Equation 2. FIG. 2B shows a coaxial embodiment of the transmission line of the invention. As there shown, a transmission line 28 includes an outer circular superconductive conductor 30 and an inner circular superconductive conductor 32 separated by a dielectric medium 34. In order to obtain maximum delay in transmission line 28, the inner circular superconductive conductor is deposited upon a non-conductive center core 36 indicated by the phantom lines in FIG. 2B. FIG. 2C shows a strip line embodiment 38 of the transmission line of the invention including a pair of parallel ground planes 40 and 42, a center parallel superconductive conductor 44 and a dielectric medium 46. Thus, from the embodiments shown in FIG. 1 and FIGS. 2A, 2B, 2C it should now be apparent that the delay line of the invention is adaptable to any of the standard transmission line geometries.

As described above, the thin film transmission line of the invention is preferably fabricated by vacuum deposition techniques. Further, as disclosed in copending application Serial 625,512, filed November 30, 1956, on behalf of Richard L. Garwin and assigned to the assignee of this invention, cryogenic gating devices are also fabricated of thin films of superconductive material. Thus it is possible to more easily fabricate, on a mass scale, circuits including a large number of both transmission lines and gating devices. One such circuit is shown in schematic form in FIG. 4, which includes a transmission line and an input and output network. Input signals are applied to a pair of terminals 50 and 52 and thence to an input network consisting of autotransformer 54, which may also be vacuum deposited, and a cryotron 56. Cryotron 56 includes a gate conductor 58, the resistance of which is controlled by a control conductor 60. Cryotron 56, as well as the remaining cryotrons in the schematic diagrams of this application, is shown as being of the conventional wire wound type, as an aid in understanding circuit operation only, it being understood that thin film cryotrons of the hereinbefore referenced copending application are preferred. A low impedance tap 62 of autotransformer 54 is connected to a thin film transmission line 64, the output of which is terminated in cryotron 66 which includes a gate conductor 68 and a control conductor 70. With no current applied to the control conductor 60, the input of transmission line 64 is shorted by the superconducting gate conductor 58 and no signals are applied thereto. Application of current to terminals 72 and 74 of sufficient magnitude generates a magnetic field which destroys superconductivity in gate conductor 58, gate conductor 58 then exhibits resistance which may have a value, by way of example, equal to the characteristic impedance, Z, of transmission line 64, thereby allowing signals applied to terminals 50 and 52 to enter and propagate along transmission line 64. Since transmission line 64 is terminated in a short circuit by means of the superconducting gate conductor 68, the signals arriving at the output of line 64 are reflected and directed back towards the input thereof. Provided control conductor 60 is deenergized prior to the arrival of the reflected signals at the input of line 64, the signals will be reflected back and forth between the input and output terminals of line 64. The line is normally discharged by applying current to a pair of terminals 76 and 78 to energize control conductor 70 and thereby switch gate conductor 68 from the superconducting to the resistive state. Further, in order to obtain rapid discharge of line 64, the resistance of gate conductor 68 is chosen equal to the characteristic impedance of line 64. In this manner, delay times equal to multiples of the total time delay of line 64 are obtained.

Figure 4:
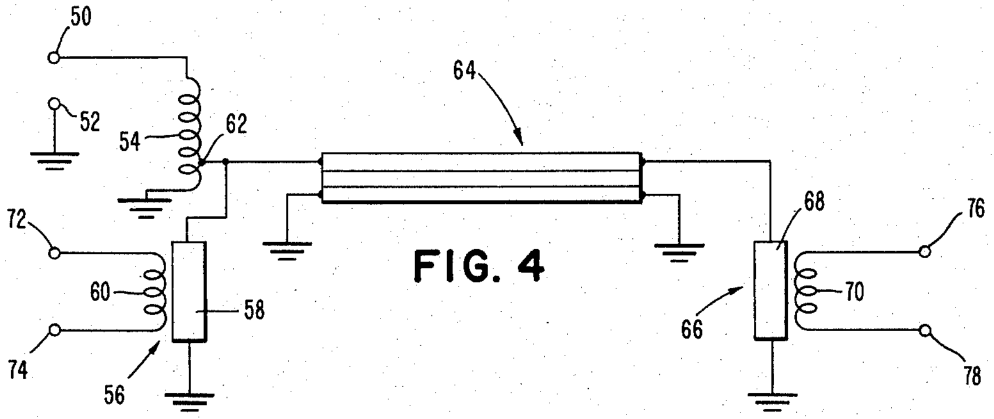
FIG. 4 is a schematic diagram of the transmission line of the invention coupled to novel input and output circuits.
Figure 5:
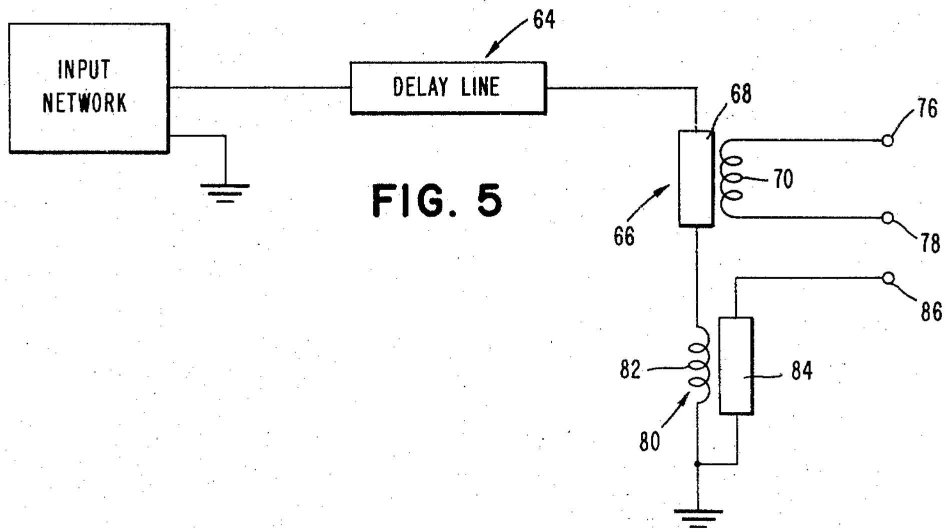
FIG. 5 is a schematic diagram illustrating a modification of the output circuit of FIG. 4.

A further embodiment of the circuit of FIG. 4 is shown in FIG. 5 where corresponding circuit elements employ the same reference numerals. The output network of FIG. 5 includes an additional cryotron 80 having a control conductor 82 connected in series with gate conductor 68 which determines the conduction state of gate conductor 84. Control conductor 82 is additionally fabricated of superconductive material to maintain a short circuit termination upon line 64. Thus, each time a signal appears at the output of line 64, current flow through control conductor 82 is sufficient to switch gate conductor 84 to the resistive state. Gate conductor 84 is thus effective to produce voltage outputs at a rate equal to twice the delay time of line 64, for each signal coupled to line 64, when a current is applied thereto at terminal 86.

Figure 6:
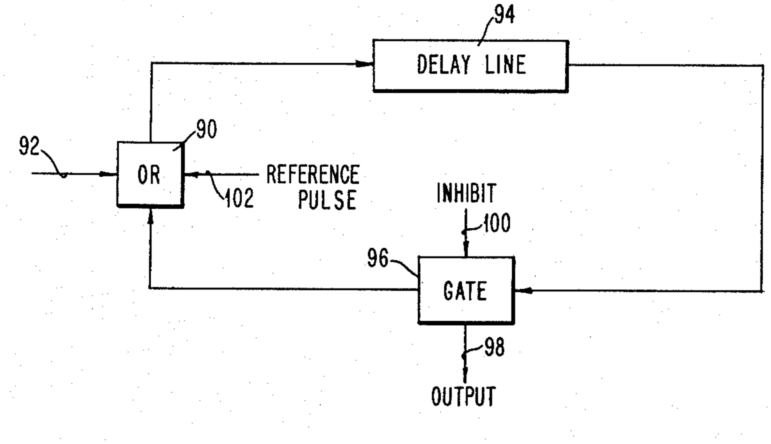
FIG. 6 is a block diagram illustrating the transmission line of the invention employed as a storage device for digital information.

FIG. 6 illustrates the thin film transmission line of the invention employed in a conventional digital storage device. Pulses representative of digital information are applied to an OR network 90 along an input line 92 and thence to the input of a delay line 94. These pulses then travel along line 94, appearing at the output thereof at a later time determined by the delay introduced by line 94. Next, the pulses are applied to a gate 96 and are either (1) delivered to an output network (not shown) along a line 98, (2) recirculated about the storage loop by means of OR network 90, or (3) effectively erased by the energization of INHIBIT line 100. In order to distinguish between various groups of digital information, reference, or timing, pulses are additionally applied to OR network 90 along a line 102, thereby indicating either the start and/or termination of each information group. The number of such information groups storable in delay line 94 is, of course, a function of the amount of total delay time introduced by line 94. It is primarily for this reason that delay line storage has not found wide spread application in digital information processing machines since, as stated hereinbefore, delay lines, according to the prior art, exhibit either excessive attenuation losses or insufficient delay time. The novel thin film delay line of the invention, however, is free of attenuation losses, at least for frequencies less than about 1000 mcs., and exhibits a delay at least an order of magnitude greater than the low loss delay lines of the prior art.

Figure 7A:
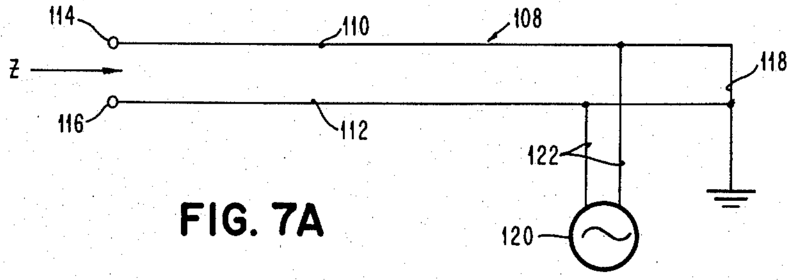
FIG. 7A is a schematic diagram of the transmission line of the invention employed as a resonant line.
Figure 7B:
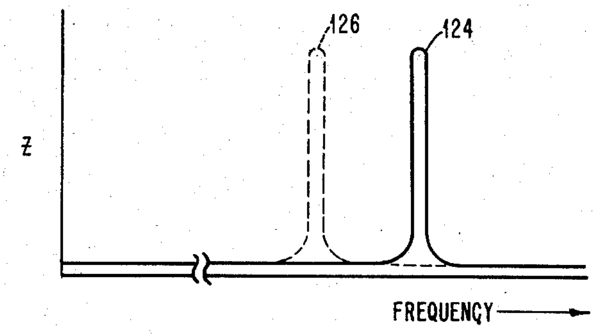
FIG. 7B illustrates the variation of input impedance of the resonant line of FIG. 7A as a function of the operating frequency.

Referring now to FIG. 7A, there is illustrated, in schematic form, a further embodiment of the transmission line of the invention, wherein the variation of velocity of propagation as a function of temperature and/or applied magnetic field is employed to vary the resonant frequency of the transmission line. As shown in FIG. 7A, a transmission line, 108, includes a pair of superconductive conductors 110 and 112, separated by a dielectric medium, having a pair of input terminals 114 and 116 and terminated in a short circuit 118. Signals are applied to line 108, from a variable frequency source 120, by means of transmission line 122, which is connected to line 108 at a relatively low impedance point. As will be understood from standard transmission line theory, standing waves will be developed along line 108 as a function of the frequency, *f*, applied by source 120. At some particular frequency, the electrical length of the line is equal to one-quarter wave length of the applied frequency and the line is said to be in resonance; that is, the voltage between terminals 114 and 116 attains its maximum value decreasing to zero at short circuit 118, while the current between terminals 114 and 116 decreases to the minimum value and attains its maximum value through short circuit 118. The resonant transmission line, therefore, exhibits a maximum value of impedance, Z, between terminals 114 and 116 since the current is a minimum simultaneously with the voltage being a maximum. This is illustrated in FIG. 7B, wherein curve 124 indicates the magnitude of the impedance Z measured between terminals 114 and 116 as a function of the frequency applied to the line. With reference to FIG. 7B, the well-known resonance curve for transmission lines appear somewhat distorted in an attempt to indicate the relatively high-Q obtainable in superconductive transmission lines. In order to demonstrate the tuneable feature of the thin film transmission line of the invention, the following initial conditions will be assumed solely for reasons of clarity and simplicity. Transmission line 108 is operated at a predetermined temperature, $T_1$, sufficiently below $T_c$ so that the penetration depth of each superconductive conductor is approximately $\lambda_0$, and the thickness, *d*, of the dielectric medium is substantially of the same magnitude as $\lambda_0$. Additionally, one or more of the conductive elements of the transmission line has a thickness comparable to $\lambda_0$. Under these conditions, the predetermined length of line 108 is resonant and equal to one-quarter wave length at a particular frequency $f_0$. Increasing the temperature towards $T_c$ is thereupon effective to increase the penetration depth $\lambda$ above the value of $\lambda_0$ and thereby, according to Equation 2, reduce the velocity of propagation as a function of temperature. From transmission line theory, it is known that the product of frequency and wave length is equal to the velocity of propagation along the line. Thus, in order that this equality be true, when the velocity of propagation is decreased, it is necessary that the resonant frequency decrease for a resonant line; that is, a line that remains electrically one-quarter of a wave length long. Referring again to FIG. 7B, dotted curve 126 indicates the new resonant frequency obtained by increasing the operating temperature.

Alternatively, the resonant frequency of the line may be decreased by applying magnetic fields to the superconductive conductors 110 and 112, (FIG. 7A), since the applied magnetic fields are additionally effective to increase the value of the penetration depth $\lambda$.

Although the transmission line of the invention is operated at a superconductive temperature, which in geneeral is of the order of 10° Kelvin or less, the apparatus for attaining and controlling the superconductive temperature has neither been shown or described since it is well known to those skilled in the art.

While the invention has been particularly shown and described with reference to preferred embodiments thereof, it will be understood by those skilled in the art that various changes in form and details may be made therein without departing from the spirit and scope of the invention.

What is claimed is:

1. A superconducting transmission line for transmitting electromagnetic signals comprising; first, second, and third elements arranged in parallel spaced relationship; said transmission line operable at a superconductive temperature; means coupling said electromagnetic signals to said transmission line; each of said first and third elements being superconducting below a predetermined critical temperature; said second element having a dielectric constant greater than unity; and at least one of said elements having a thickness comparable to the penetration depth of magnetic fields in said first and third superconducting elements when said magnetic fields are produced by electromagnetic signals propagated along said line.

2. A superconductive transmission line for transmitting electromagnetic signals comprising; a pair of superconductive parallel conductors separated by a dielectric medium; means coupling said electromagnetic signals to said transmission line; means maintaining said transmission line at a superconductive temperature; at least one of said conductors and said dielectric medium having a thickness comparable to the penetration depth of magnetic fields generated by electromagnetic signals propagated along said line.

3. A superconductive circuit for generating a plurality of output pulses from a single applied input pulse comprising; a thin film superconductive transmission line having input and output terminals; input and output means coupled to said input and output terminals, respectively; each of said input and output means including a superconductive gating device switchable between the superconducting and resistive states; means connecting said gating devices electrically in parallel with each of said input and output terminals, respectively; means maintaining said circuit at a superconductive temperature whereby each of said gating devices is normally superconducting; means for applying a pulse signal through said input means to said transmission line including means for switching said input gating device to the resistive state only during the time interval said pulse signal is applied through said input means; and means for developing a sequence of ouput pulses separated by a time interval equal to twice the delay time of said transmission line, including superconductive control conductor means associated with a third superconductive gating device for applying magnetic fields thereto, means connecting said control conductor means in series with said output gating device, said control conductor means effective when current flows therethrough to switch said third gating device to the resistive state.

4. The circuit of claim 3 including means to terminate said sequence of output pulses including means for switching said output gating device to the resistive state.

5. In a transmission line having first and second superconductive conductors separated by a dielectric medium and operated at a superconductive temperature, the imimprovement consisting of dimensioning said transmission line such that the thickness of said first conductor, said second conductor, and said dielectric medium is comparable to the penetration depth of the magnetic fields in said first and second conductors.

6. A superconductive circuit comprising; a superconductive transmission line having a predetermined physical length; means coupling a short circuit to one end of said transmission line; means coupling an open circuit to the other end of said transmssion line; said transmission line including a pair of superconductive conductors separated by a dielectric medium; the thickness of said medium being substantially equal to or less than the penetration depth of magnetic fields in said conductors; means maintaining said line at a superconductive temperature whereby said line is resonant at a predetermined frequency; a variable frequency source; means coupling said source to a low impedance point along said line; and a plurality of means to vary the electrical length of said line.

7. The circuit of claim 6 wherein a first of said plurality of means includes means to vary said superconductive temperature at which said line is maintained.

8. The circuit of claim 6 wherein a second of said plurality of means includes means for applying magnetic fields to said line.

9. A superconductive circuit comprising; a superconductive transmission line having a predetermined physical length; means coupling a first discontinuity to one end of said transmission line; means coupling a second discontinuity to the other end of said transmission line; said transmission line including a pair of superconductive conductors separated by a dielectric medium; the thickness of said medium being substantially equal to or less than the penetration depth of magnetic fields in said conductors; means maintaining said line at a superconductive temperature whereby said line is resonant at a predetermined frequency; a variable frequency source; means coupling said source to a low impedance point along said line; and a plurality of means to vary the electrical length of said line.

10. A superconductor delay line comprising; a transmission line for transmitting electromagnetic signals; means maintaining said transmission line at a superconductive temperature; means coupling said electromagnetic signals to said transmission line; said transmission line including first and second conductors of superconductive material separated by a dielectric medium; at least one of said conductors and said medium having a thickness less than the penetration depth of magnetic fields applied to said delay line as a result of signals travelling along said delay line; and means varying said superconductive temperature to thereby vary the delay exhibited by said superconductive delay line.

11. A superconductive delay line comprising; a transmission line for transmitting electromagnetic signals; means maintaining said transmission line at a superconductive temperature; means coupling said electromagnetic signals to said transmission line; said transmission line including first and second conductors of superconductive material separated by a dielectric medium; at least one of said conductors and said medium having a thickness less than the penetration depth of magnetic fields applied to said delay line; means applying a magnetic field transversely to said delay line to thereby vary the delay exhibited by said superconductive delay line; and said applied magnetic field being less than the critical magnetic field of said first and second conductors.

References Cited by the Examiner

UNITED STATES PATENTS

| | | | |
|---|---|---|---|
| 2,916,615 | 12/59 | Lundburg | 307—88.5 |
| 2,938,160 | 5/60 | Steele | 307—88.5 |

JOHN W. HUCKERT, *Primary Examiner.*

HERMANN KARL SAALBACH, *Examiner.*